United States Patent
Calva et al.

(10) Patent No.: US 9,206,753 B2
(45) Date of Patent: Dec. 8, 2015

(54) METHOD AND DEVICE FOR CONTROLLING AN INTERNAL COMBUSTION ENGINE

(75) Inventors: Elias Calva, Stuttgart (DE); Karthik Rai, Stuttgart (DE); Norbert Mueller, Ludwigsburg (DE); Ruediger Weiss, Moetzingen (DE); Manfred Dietrich, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 362 days.

(21) Appl. No.: 13/822,032

(22) PCT Filed: Jul. 27, 2011

(86) PCT No.: PCT/EP2011/062923
§ 371 (c)(1),
(2), (4) Date: Mar. 11, 2013

(87) PCT Pub. No.: WO2012/031827
PCT Pub. Date: Mar. 15, 2012

(65) Prior Publication Data
US 2013/0179054 A1    Jul. 11, 2013

(30) Foreign Application Priority Data
Sep. 10, 2010   (DE) .......................... 10 2010 040 562

(51) Int. Cl.
*F02N 11/08*     (2006.01)
*F02N 19/00*     (2010.01)
(Continued)

(52) U.S. Cl.
CPC .............. *F02D 41/062* (2013.01); *F02D 17/02* (2013.01); *F02D 41/065* (2013.01);
(Continued)

(58) Field of Classification Search
CPC . F02D 17/02; F02N 11/0844; F02N 11/0855; F02N 11/0814; F02N 11/0851; F02N 11/0822; F02N 19/005; F02N 2019/008; F02N 99/004; F02N 99/006
USPC ...................... 123/179.3, 179.4; 701/112, 113
See application file for complete search history.

(56) References Cited

U.S. PATENT DOCUMENTS 7,079,941 B2 *   7/2006   Tetsuno et al. ................ 701/112
7,562,650 B2 *   7/2009   Tabata et al. ................... 123/491

(Continued)

FOREIGN PATENT DOCUMENTS

CN       102102615       6/2011
EP       1582737         10/2005

(Continued)

OTHER PUBLICATIONS

International Search Report for Application No. PCT/EP2011/062923 dated Nov. 3, 2011 (2 pages).

*Primary Examiner* — Stephen K Cronin
*Assistant Examiner* — George Jin
(74) *Attorney, Agent, or Firm* — Michael Best & Friedrich LLP

(57) ABSTRACT

The invention relates to a method for restarting an internal combustion engine, in which a first cylinder (ZYL1) has a low air level and a second cylinder (ZYL2) has a high air level, and wherein a predefined speed threshold value (ns) is selected as a function of said air levels. A method for the restart is selected and carried out as a function of a comparison of the determined speed (n) of the internal combustion engine with the predefined speed threshold value (ns).

14 Claims, 8 Drawing Sheets

(51) Int. Cl.
*F02D 41/06* (2006.01)
*F02D 17/02* (2006.01)
*F02N 99/00* (2010.01)
*F02D 41/00* (2006.01)
*F02D 41/14* (2006.01)
*F02D 41/04* (2006.01)

(52) U.S. Cl.
CPC ....... *F02N 11/0814* (2013.01); *F02N 11/0822* (2013.01); *F02N 11/0844* (2013.01); *F02N 11/0851* (2013.01); *F02N 11/0855* (2013.01); *F02N 19/005* (2013.01); *F02N 99/006* (2013.01); *F02D 41/0002* (2013.01); *F02D 41/042* (2013.01); *F02D 41/1402* (2013.01); *F02N 2019/008* (2013.01); *F02N 2200/022* (2013.01); *F02N 2250/04* (2013.01); *F02N 2300/102* (2013.01); *F02N 2300/2002* (2013.01); *F02N 2300/2011* (2013.01); *Y02T 10/48* (2013.01)

(56) References Cited

U.S. PATENT DOCUMENTS

| | | | |
|---|---|---|---|
| 8,566,007 B2* | 10/2013 | Shoda et al. | 701/104 |
| 2003/0041830 A1* | 3/2003 | Sugiura et al. | 123/179.4 |
| 2004/0221828 A1* | 11/2004 | Ries-Mueller et al. | 123/179.3 |
| 2005/0221952 A1* | 10/2005 | Tetsuno et al. | 477/115 |
| 2010/0050970 A1* | 3/2010 | Okumoto et al. | 123/179.4 |
| 2010/0132647 A1* | 6/2010 | Dietrich | 123/179.3 |
| 2011/0172901 A1* | 7/2011 | Okumoto et al. | 701/113 |
| 2011/0246050 A1* | 10/2011 | Roessle et al. | 701/113 |
| 2011/0288752 A1* | 11/2011 | Muller | 701/112 |
| 2012/0116653 A1* | 5/2012 | Hozumi et al. | 701/103 |

FOREIGN PATENT DOCUMENTS

| | | |
|---|---|---|
| EP | 2159410 | 3/2010 |
| JP | 2007270808 | 10/2007 |
| JP | 2008298031 | 12/2008 |
| JP | 2009062959 | 3/2009 |
| JP | 2010185425 | 8/2010 |
| WO | 2010046164 | 4/2010 |

* cited by examiner

METHOD AND DEVICE FOR CONTROLLING AN INTERNAL COMBUSTION ENGINE

BACKGROUND OF THE INVENTION

Particularly in the case of vehicles with start/stop technology, i.e. when the engine is frequently switched off and on again during normal driving operation, comfortable running down of the internal combustion engine and rapid restarting of the internal combustion engine is of great importance.

JP-2008298031 A describes a method in which the throttle valve of the internal combustion engine is closed during rundown in order to suppress vibration. By means of this measure, the air charge in the cylinders in the internal combustion engine is reduced, thus reducing the roughness of rundown since compression and decompression are minimized.

To restart the internal combustion engine, however, as much air as possible is required in the cylinders in which ignition takes place for the restart. There is therefore a conflict of aims between rapid engine starting (which requires a large amount of air in the cylinder) and comfortable, i.e. low-vibration, engine rundown (which requires a small amount air in the cylinder).

Methods for restarting the internal combustion engine in which the internal combustion engine is allowed to come to a halt before it is restarted are common knowledge. Particularly in "change-of-mind situations", in which there is a start request while the internal combustion engine is still running down, this leads to delays between the start request and engine starting, which are perceptible and felt to be inconvenient.

Devices which modify the stroke profile particularly of the inlet valves of the internal combustion engine and thus adjust the air charge in the cylinders are common knowledge in the prior art. In particular, the fact that the stroke profile of the inlet valves can be configured as desired within wide limits by means of electrohydraulic actuators is known. Internal combustion engines with such electrohydraulic valve adjustment do not require a throttle valve. It is likewise known that the stroke profile, particularly of the inlet valves, can be varied by adjusting the camshaft. Devices of this kind and the throttle valve, with which the air charge in the cylinders can be modified, are also referred to below as air metering devices.

SUMMARY OF THE INVENTION

It is the advantage of the method according to the invention that particularly rapid restarting of the internal combustion engine is ensured, especially in change-of-mind situations.

If a low charge is produced in a first cylinder and a high air charge is produced in a second cylinder during engine rundown, by means of the air metering device for example, particularly good prediction of the rundown behavior of the internal combustion engine is possible. It is possible to define a speed threshold value which discriminates whether the second cylinder continues into a power stroke or whether the internal combustion engine goes into a final oscillatory movement before the second cylinder goes into the power stroke, depending on whether a determined speed of the internal combustion engine is higher or lower than the speed threshold value. This knowledge of the rundown behavior of the internal combustion engine makes it possible to initiate targeted measures for particularly rapid restarting of the internal combustion engine.

If the determined speed of the internal combustion engine is higher than the speed threshold value, it is certain that the kinetic rotational energy of the internal combustion engine is sufficiently high to ensure that the second cylinder will go into the power stroke. If the fuel/air mixture is ignited in this cylinder, direct follow-on starting of the internal combustion engine is carried out. This follow-on starting process takes place without the use of a starter and is particularly rapid since there is no need to wait for the internal combustion engine to run down.

If the determined speed of the internal combustion engine is lower than the speed threshold value, a very good prediction of the oscillatory behavior of the internal combustion engine during rundown is possible. Since a starter of the internal combustion engine can only be meshed if the speed of the internal combustion engine is sufficiently low, it is important to determine the speed of the internal combustion engine in order to be able to mesh the starter at an appropriate time and start the engine. However, since the starter has a dead time (e.g. 50 ms), it is necessary to know the appropriate times for meshing at an early stage. It is therefore particularly advantageous for rapid halting of the internal combustion engine if the speed profile of the internal combustion engine is predicted and a first meshing time or a second meshing time is determined from the predicted speed profile. A particularly large gain in the rapidity of restarting is obtained particularly if these meshing times are before the internal combustion engine comes to a halt.

During the oscillatory motion of the internal combustion engine, the speed profile of the internal combustion engine passes through zero points at the reversal points of the rotary motion, i.e. when there is a reversal in the direction of the oscillatory motion. At these points, there is a particularly robust possibility of meshing the starter since the speed is low in an interval around the point where the speed passes through zero. For particularly rapid restarting, it is advantageous if the next possible reversal time or reversal point of the rotary motion of the internal combustion engine is selected as the first meshing time. In this context, the next possible reversal time is the next one of the reversal times that is suitable for meshing the starter and carrying out starting.

To ensure that the starter is activated in such a way that it meshes and starting is carried out at the desired time after the start request has been detected, despite its dead time, it is particularly advantageous if the next possible reversal time follows a time at which the start request is determined by at least one specifiable activation dead time. Thus, the next possible reversal time cannot be specified as the next reversal time after the time of the start request but as the next reversal time that follows the time of the start request by at least the specifiable activation dead time.

If the oscillatory motion of the internal combustion engine has already slowed down to such an extent that meshing of the starter is possible in all cases, it is not necessary to predict the reversal points of the oscillatory motion to enable the starter to mesh and starting to be carried out. The second meshing time is therefore advantageously selected in such a way that the speed of the internal combustion engine no longer leaves a specifiable speed range from the second meshing time onwards. This method is particularly robust, and there is also an advantage in terms of speed since it is then no longer necessary to wait for a reversal point of the oscillatory motion in order to engage the internal combustion engine. Since the speed thresholds at which the starter can be meshed are generally different for forward rotation and reverse rotation of the internal combustion engine, it is advantageous to monitor the two thresholds separately. Normally, the starter can be meshed at a higher speed when the internal combustion engine is rotating forwards than when it is rotating backwards.

If the second meshing time is selected in such a way that the predicted speed does not exceed a specifiable positive threshold from the second meshing time onwards, a speed advantage is obtained since reliable meshing is then already possible, at least in the case where the internal combustion engine is rotating forwards.

If the second meshing time is selected in such a way that the predicted speed does not fall below a specifiable negative threshold from the second meshing time onwards, the method is particularly robust since reliable meshing is then possible in the forward and backward directions.

Of course, these advantages are also obtained if the starter can be meshed at relatively high speeds during reverse rotation of the internal combustion engine. The only decisive factor is that the respective advantages of the two thresholds should be exploited.

BRIEF DESCRIPTION OF THE DRAWINGS

Embodiments of the invention are explained in greater detail below with reference to the attached drawing. In the drawing.

DETAILED DESCRIPTION

Figure 1:
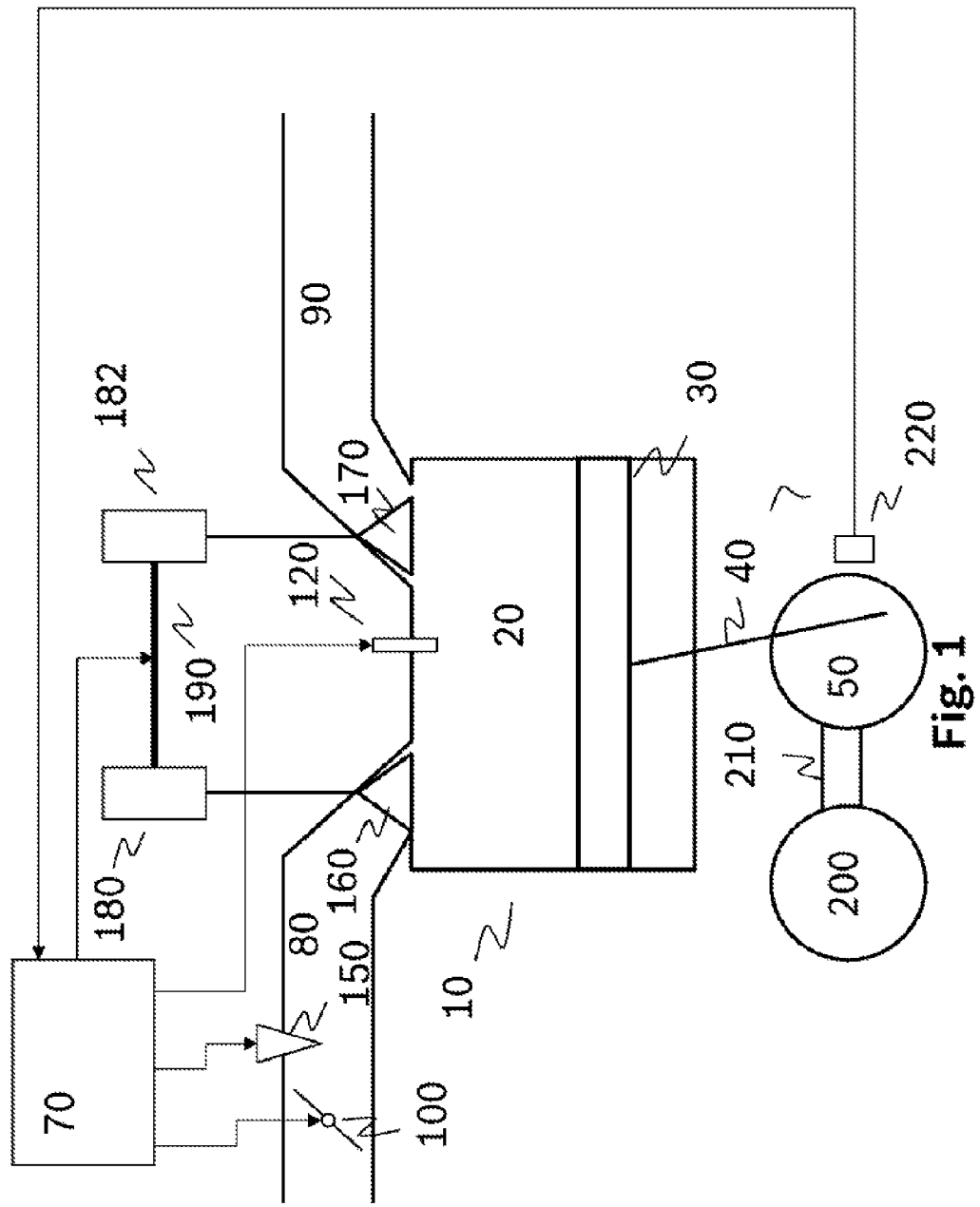
FIG. 1 shows the depiction of a cylinder of an internal combustion engine.

FIG. 1 shows a cylinder 10 of an internal combustion engine having a combustion chamber 20, a piston 30, which is connected by a connecting rod 40 to a crankshaft 50. The piston 30 performs an up and down motion in a known manner. The reversal points of the motion are referred to as dead center positions. The transition from an upward motion to a downward motion is referred to as the top dead center position, while the transition from a downward motion to an upward motion is referred to as the bottom dead center position. An angular position of the crankshaft 50, referred to as a crank angle, is conventionally defined relative to the top dead center position. A crankshaft sensor 220 detects the angular position of the crankshaft 50.

Air to be combusted is sucked into the combustion chamber 20 via an intake pipe 80 in a known manner during a downward motion of the piston 30. This is referred to as the intake stroke or inlet stroke. The combusted air is forced out of the combustion chamber 20 via an exhaust pipe 90 during an upward motion of the piston 30. This is usually referred to as the exhaust stroke. The quantity of air sucked in via the intake pipe 80 is set by means of an air metering device, in the illustrative embodiment a throttle valve 100, the position of which is determined by a control device 70.

Via an intake pipe injection valve 150, which is arranged in the intake pipe 80, fuel is injected into the air sucked out of the intake pipe 80, and a fuel/air mixture is produced in the combustion chamber 20. The quantity of fuel injected through the intake pipe injection valve 150 is determined by the control device 70, generally by means of the duration and/or level of an activation signal. A spark plug 120 ignites the fuel/air mixture.

An inlet valve 160 at the inlet from the intake pipe 80 to the combustion chamber 20 is driven via cams 180 by a camshaft 190. An outlet valve 170 at the inlet from the exhaust pipe 90 to the combustion chamber 20 is likewise driven via cams 182 by the camshaft 190. The camshaft 190 is coupled to the crankshaft 50. The camshaft 190 generally performs one revolution for every two revolutions of the crankshaft 50. The camshaft 190 is designed in such a way that the outlet valve 170 opens in the exhaust stroke and closes in the vicinity of the top dead center position. The inlet valve 160 opens in the vicinity of the top dead center position and closes in the inlet stroke. A phase in which the outlet valve 170 and the inlet valve in one system are opened simultaneously is referred to as valve overlap. Such valve overlap is used for internal exhaust gas recirculation, for example. The camshaft 190 can be designed, in particular, for activation by the control device 70, making it possible to set different stroke profiles for the inlet valve 160 and the outlet valve 170 in accordance with the operating parameters of the internal combustion engine.

However, it is also possible for the inlet valve 160 and the outlet valve 170 not to be moved up and down by means of the camshaft 190 but by means of electrohydraulic valve actuators. In this case, the camshaft 190 and the cams 180 and 182 can be omitted. There is likewise no need for the throttle valve 100 with such electrohydraulic valve actuators.

A starter 200 can be connected mechanically to the crankshaft 50 by a mechanical coupling 210. The production of the mechanical connection between the starter 200 and the crankshaft 50 is also referred to as meshing. Release of the mechanical connection between the starter 200 and the crankshaft 50 is also referred to as disengagement. Meshing is possible only if the speed of the internal combustion engine is below a speed threshold value dependent on the internal combustion engine and the starter.

Figure 2:
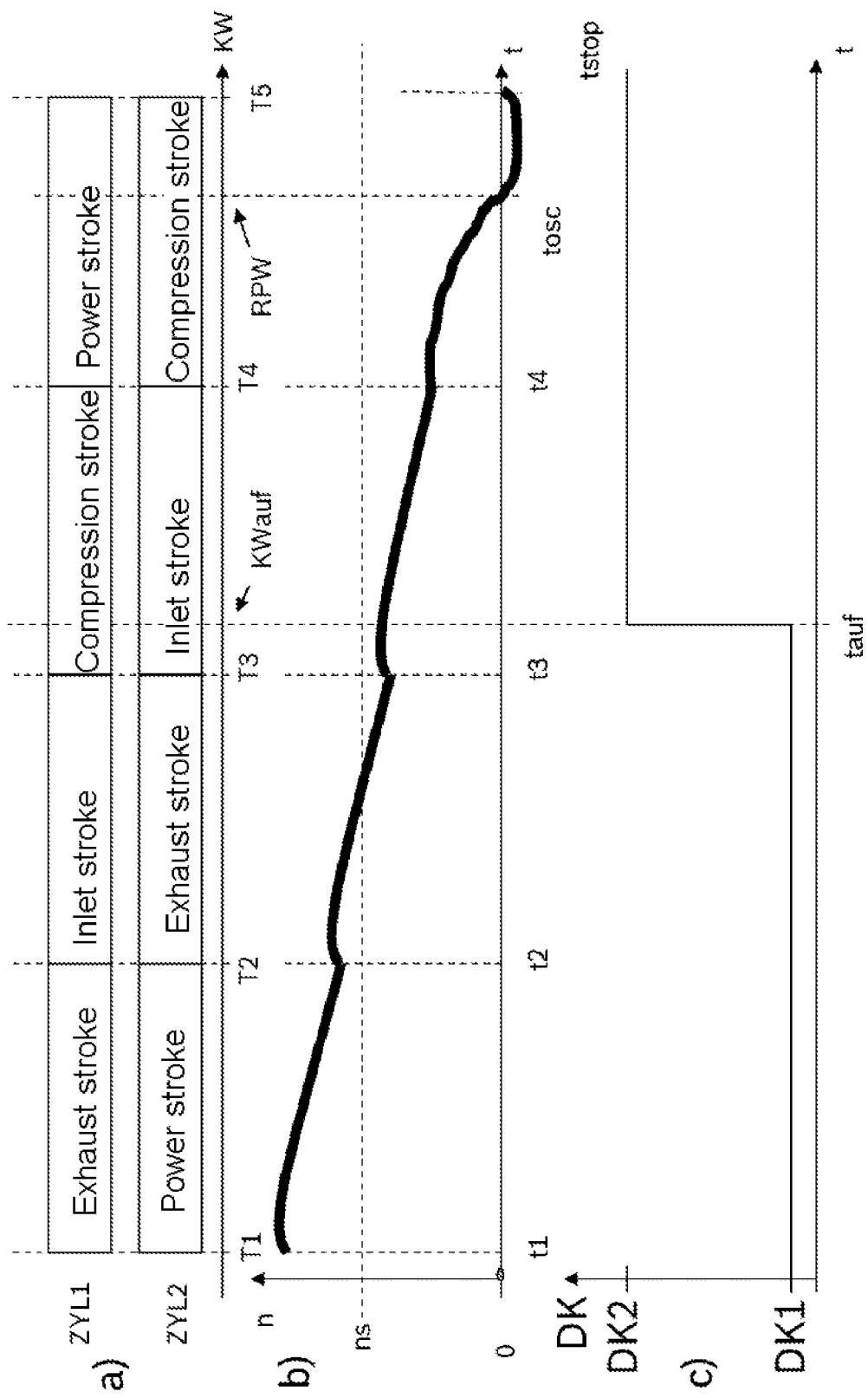
FIG. 2 shows schematically the profile of a number of parameters of the internal combustion engine as the internal combustion engine is stopped.

FIG. 2 shows the behavior of the internal combustion engine as the internal combustion engine is stopped. FIG. 2a shows the sequence of the various strokes of a first cylinder ZYL1 and of a second cylinder ZYL2, plotted against the angle of the crankshaft KW. A first dead center position T1, a second dead center position T2, a third dead center position T3, a fourth dead center position T4 and a fifth dead center position T5 of the internal combustion engine are plotted. Between these dead center positions, the first cylinder ZYL1 runs through the exhaust stroke, the inlet stroke, a compression stroke and a power stroke in a known manner. In the illustrative embodiment of an internal combustion engine having four cylinders, the strokes of the second cylinder ZYL2 are offset by 720°/4=180°. Based on the first cylinder ZYL1, the first dead center position T1, the third dead center position T3 and the fifth dead center position T5 are bottom dead center positions, while the second dead center position T2 and the fourth dead center position T4 are top dead center positions. Based on the second cylinder ZYL2, the first dead center position T1, the third dead center position T3 and the fifth dead center position T5 are top dead center positions, while the second dead center position T2 and the fourth dead center position T4 are bottom dead center positions.

FIG. 2b shows the profile of a speed n of the internal combustion engine against time t in parallel with the strokes illustrated in FIG. 2a. The speed n is defined as the time derivative of the crank angle KW, for example. The first dead center position T1 corresponds to a first time t1, the second dead center position T2 corresponds to a second time t2, the third dead center position T3 corresponds to a third time t3, and the fourth dead center position T4 corresponds to a fourth time t4. Between each two successive times, e.g. between the first time t1 and the second time t2, the speed initially rises briefly, and then falls monotonically. The brief rise in speed is due to the compression of the air charge in the cylinders. A cylinder running through a top dead center position compresses the air charge therein to the maximum extent, and therefore compression energy is stored therein. Part of this compression energy is converted into rotational energy as the internal combustion engine continues to rotate.

FIG. 2c shows the time profile of an activation signal DK of the throttle valve 100 in parallel with FIG. 2a and FIG. 2b. As is known from the prior art, the throttle valve 100 is initially closed as the internal combustion engine is stopped, this corresponding to a first activation signal DK1. If, as illustrated in FIG. 2b, the speed n of the internal combustion engine falls below a speed threshold value ns, e.g. 300 rpm, then, according to the invention, the throttle valve 100 is opened at an opening time tauf, corresponding to a second activation signal DK2. Here, the opening time tauf is selected in such a way that it occurs shortly after the third dead center position T3, which is the next dead center position after the speed n of the internal combustion engine falls below the speed threshold value ns. At the third dead center position T3, the second cylinder ZYL2 goes into the inlet stroke. In what follows, therefore, it is also referred to as inlet cylinder ZYL2. In the illustrative embodiment, the opening time tauf coincides with the end of valve overlap in the inlet cylinder, i.e. with the time at which the outlet valve 170 of the inlet cylinder ZYL2 closes. Based on the top dead center position of the inlet cylinder ZYL2, the opening time tauf corresponds to an opening crank angle KWauf. To determine the time at which the speed n of the internal combustion engine has fallen below the speed threshold value ns, the speed n of the internal combustion engine can either be monitored continuously. Since the rise in the speed n of the internal combustion engine is small after the dead center positions, and the opening time tauf is supposed to be shortly after a dead center position, however, it is also possible to check at each dead center position of the internal combustion engine whether the speed n of the internal combustion engine has fallen below the speed threshold ns. In the illustrative embodiment illustrated in FIG. 2b, the fact that the speed n of the internal combustion engine has not yet fallen below the speed threshold ns is detected at the first time t1 and the second time t2. At the third time t3, the system detects for the first time that the speed n of the internal combustion engine has fallen below the speed threshold ns, and the throttle valve 100 opens.

Figure 3:
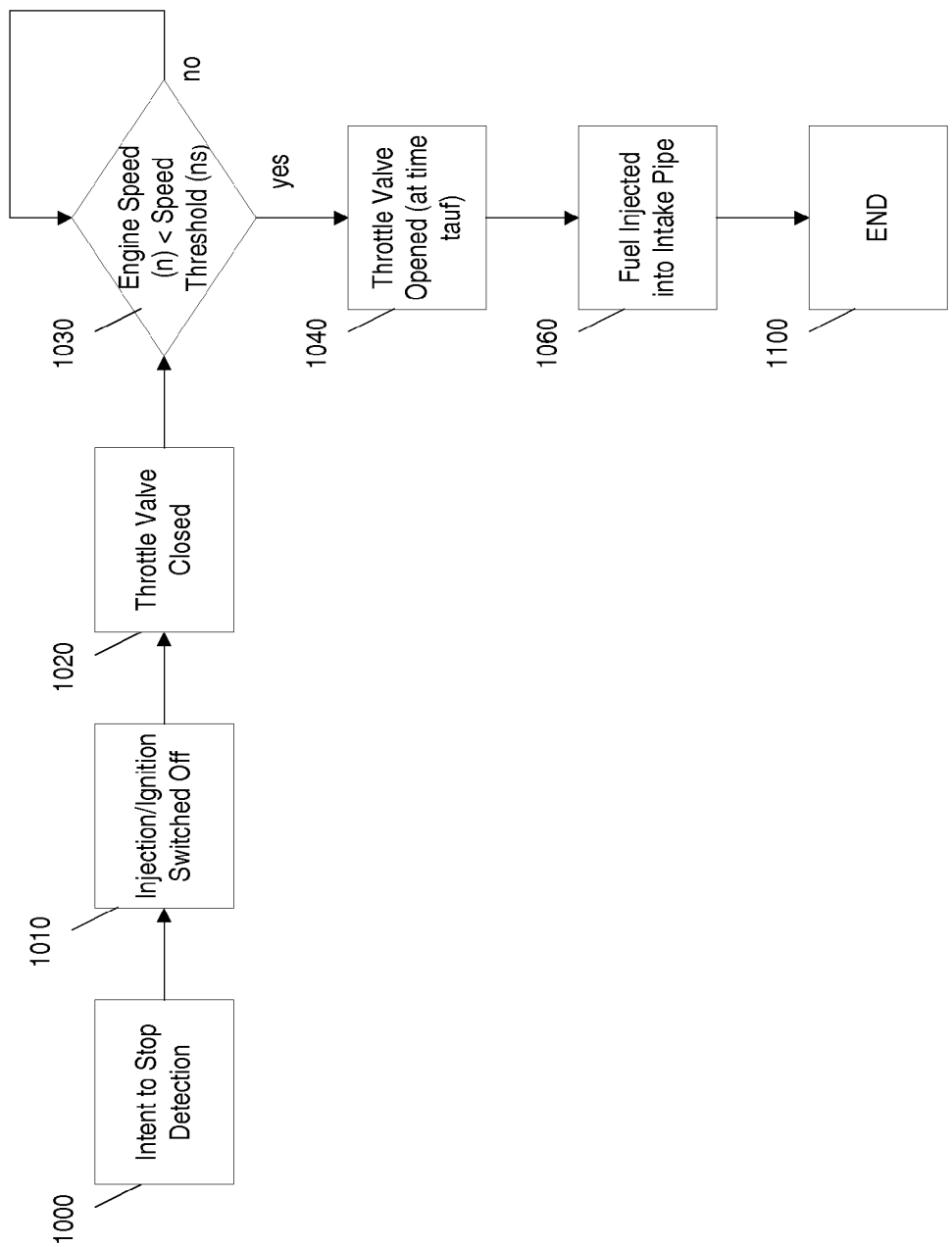
FIG. 3 shows the sequence of the method according to the invention for stopping the internal combustion engine.

The opening of the throttle valve 100 then allows a large amount of air to flow into the inlet cylinder in the inlet stroke. If the inlet cylinder ZYL2 goes into the compression stroke after the fourth time t4, the compression work to be performed on the air charge, which is greatly increased relative to the other cylinders, exceeds the compression energy released in the expanding cylinders, and the speed n of the internal combustion engine falls rapidly until it falls to zero at a reverse oscillation time tosc. The rotary motion of the crankshaft 50 is now reversed, and the speed n of the internal combustion engine becomes negative. The reverse oscillation time tosc corresponds to a reverse oscillation angle RPW of the crankshaft 50 which is indicated in FIG. 2a. At a stop time tstopp, the internal combustion engine comes to a halt. It should be noted that the time axis is depicted in a nonlinear manner. In accordance with the drop in the speed n of the internal combustion engine, the time interval between the third time t3 and the fourth time t4 is longer than the time interval between the second time t2 and the third time t3, which in turn is longer than the time interval between the first time t1 and the second time t2. The fifth dead center position T5 of the internal combustion engine is not reached. In the time interval between the reverse oscillation time tosc and the stop time tstopp, the crankshaft 50 performs an oscillatory motion, during which the second cylinder ZYL2 oscillates in the compression stroke and the inlet stroke thereof, while the first cylinder ZYL1 oscillates in a corresponding manner in the power stroke and the compression stroke thereof FIG. 3 shows the sequence of the method, which corresponds to the method illustrated in FIG. 2. With the internal combustion engine running, it is determined in a stop detection step 1000 that the intention is to switch off the internal combustion engine. This is followed by step 1010, in which injection and ignition are switched off. The internal combustion engine is thus in the rundown mode. There then follows step 1020, in which the throttle valve is closed. In the case of internal combustion engines with camshaft adjustment, a switchover to a smaller cam can take place in step 1020 as an alternative, thus reducing the air charge in the cylinders. In the case of internal combustion engines with electrohydraulic valve adjustment, the valves of the internal combustion engine can be closed in step 1020. There follows step 1030, in which the system checks whether the speed n of the internal combustion engine has fallen below the speed threshold value ns. If this is the case, step 1040 follows. If this is not the case, step 1030 is repeated until the speed n of the internal combustion engine has fallen below the speed threshold value ns. In step 1040, the throttle valve 100 is opened at opening time tauf. In the case of internal combustion engines with camshaft adjustment, it is possible instead for a switch to be made to a larger cam in step 1040, for example, resulting in an increase in the air charge in the inlet cylinder ZYL2. In the case of internal combustion engines with electrohydraulic valve adjustment, the inlet valve 160 of the inlet cylinder ZYL2 can be activated in such a way in step 1040 that it is open during the inlet stroke of the inlet cylinder ZYL2, thus increasing the air charge in the inlet cylinder ZYL2. There follows step 1060. In the optional step 1060, fuel is injected via the intake pipe injection valve 150 into the intake pipe 80 of the internal combustion engine. This injection of fuel is performed in such a way that a fuel/air mixture is sucked into the inlet cylinder ZYL2 in the inlet stroke. In step 1100, the method according to the invention ends. As illustrated in FIG. 2b, the internal combustion engine oscillates into a stationary position, in which the inlet cylinder ZYL2 comes to rest in the inlet stroke or in the compression stroke. Injection of fuel in step 1060 is advantageous for rapid restarting of the internal combustion engine when it is an internal combustion engine with intake pipe injection.

Figure 4:
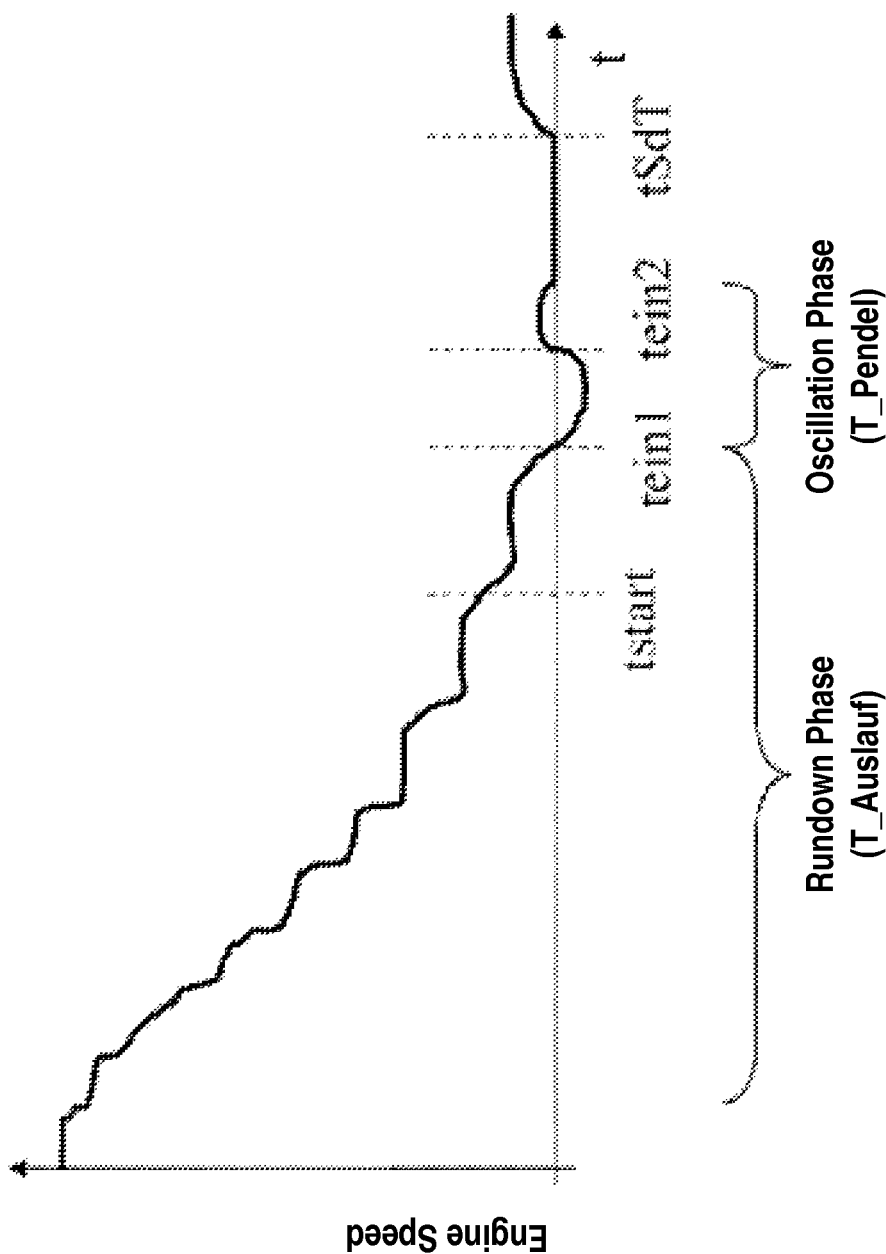
FIG. 4 shows a speed profile during the stopping and restarting of the internal combustion engine.

FIG. 4 shows the time profile of the speed n of the internal combustion engine when stopping and restarting. The speed n of the internal combustion engine falls during a rundown phase T_Auslauf in the manner illustrated in FIG. 2b, and finally the sign changes when the rotary motion of the internal combustion engine is reversed at the reverse oscillation time tosc illustrated in FIG. 2b. This is illustrated in FIG. 4 as the end of the rundown phase T_Auslauf and the beginning of an oscillation phase T_Pendel. While the rundown phase T_Auslauf is still ongoing, the system determines at a starting request time tstart that the internal combustion engine is to be restarted because, for example, the system has detected that a driver has pressed a gas pedal. A determined start request of this kind before the stop time tstopp, is also referred to as a "change of mind". In the oscillation phase T_Pendel, the profile of the speed n of the internal combustion engine undergoes a resulting variation until it falls to a constant zero at the stop time tstopp illustrated in FIG. 2b and remains there. In FIG. 4, the stop time tstopp marks the end of the oscillation phase T_Pendel.

In the prior art method for starting the internal combustion engine, the oscillation phase T_Pendel is followed by detection of the fact that the internal combustion engine is stationary, the starter 200 is meshed, and the starter is activated. After an activation dead time T_tot of the starter 200 of, for example, 50 ms, which is not illustrated in FIG. 4, the starter 200 begins a rotary motion at a time tSdT and thus imparts motion to the crankshaft 50 once again. In the method according to the invention, in contrast, a first meshing time tein1 and, if appropriate, a second meshing time tein2 is determined. The first meshing time tein1 and the second meshing time tein2 are characterized in that the speed n of the internal combustion engine is sufficiently low for the starter 200 to be meshed. The first meshing time tein1 and the second meshing time tein2 are determined by the control device 70. If the time interval between the starting request time tstart and the first meshing time tein1 is longer than the activation dead time T_tot, the starter 200 is meshed and activated in such a way that it begins a rotary motion at the first meshing time tein1. If the first meshing time tein1 is too close in time to the starting request time tstart, the starter 200 is meshed and activated in such a way that it begins a rotary motion at the second meshing time tein2.

Figure 5:
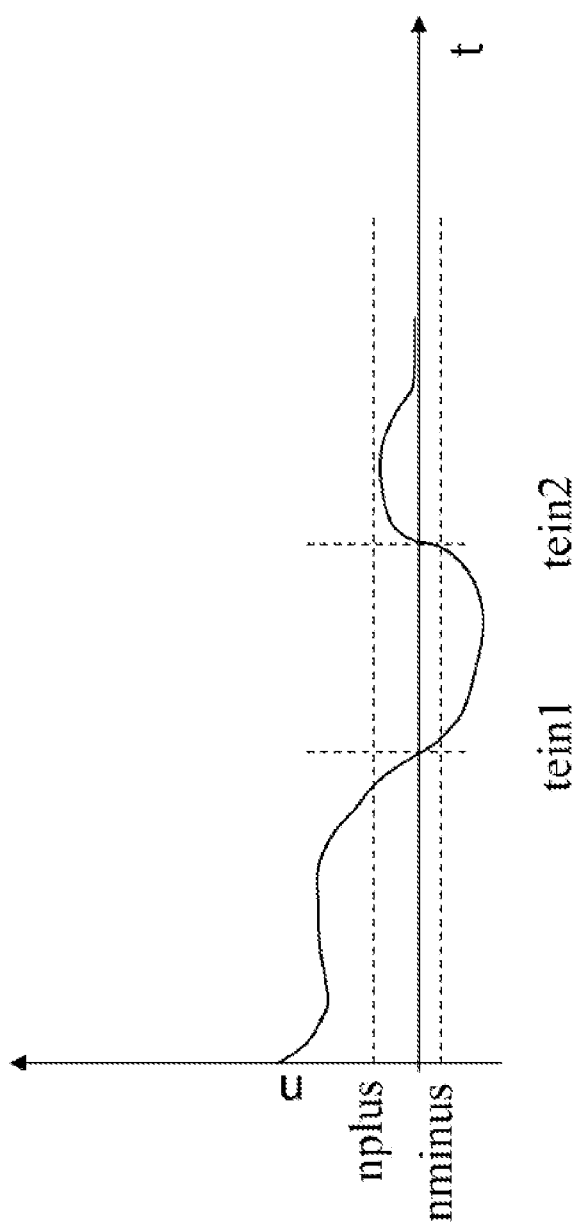
FIG. 5 shows a detailed view of the speed profile during the stopping and restarting of the internal combustion engine.

FIG. 5 illustrates in detail the selection of the first meshing time tein1 and the second meshing time tein2. As described, the speed n of the internal combustion engine falls rapidly to zero after the opening time tauf, and the internal combustion engine begins a reverse motion at reverse oscillation time t_osc. The first meshing time tein1 is determined by means of characteristic maps or by means of models stored in the control device 70, for example, after the opening of the throttle valve 100 and corresponds to the estimated reverse oscillation time tosc. It is, of course, also possible for different times at which the speed n of the internal combustion engine passes through zero to be predicted and selected as the first meshing time tein1 instead of the reverse oscillation time tosc.

In addition to the passage of the speed n of the internal combustion engine through zero, a second meshing time tein2 can be selected, from which time onwards it is ensured that the speed n of the internal combustion engine will no longer leave a speed range in which meshing of the starter 200 is possible. This speed range is given, for example, by a positive threshold nplus, e.g. 70 rpm, up to which the starter 200 can be meshed during a forward rotation of the internal combustion engine, and by a negative threshold nminus, e.g. 30 rpm, up to which the starter 200 can be meshed during a reverse rotation of the internal combustion engine. Using characteristic maps, for example, the control device 70 calculates that the kinetic energy of the internal combustion engine has fallen from the second meshing time tein2 to such an extent that the speed range [nminus, nplus] will no longer be exceeded. At the second meshing time tein2 or at any time after the second meshing time tein2, the starter 200 can be meshed and made to perform a rotary motion.

Figure 6:
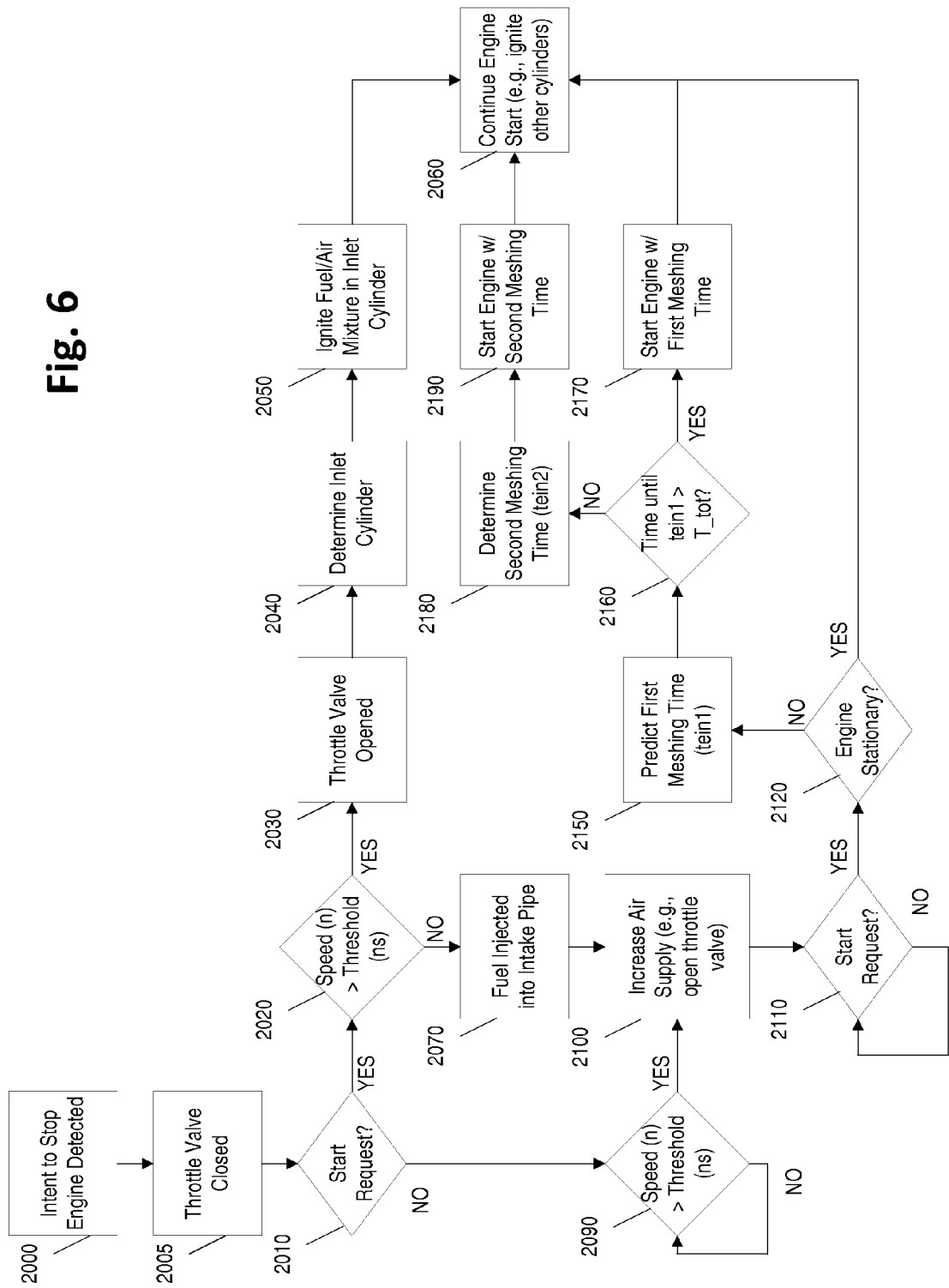
FIG. 6 shows the sequence of the method according to the invention during the restarting of the internal combustion engine.

FIG. 6 shows the sequence of the method according to the invention for restarting the internal combustion engine. Step 2000 coincides with step 1000 illustrated in FIG. 3. In this step, a request to stop the internal combustion engine is determined. There follows step 2005. In step 2005, the throttle valve is closed, or other measures, e.g. adjustment of the cams 180, 182 or appropriate electrohydraulic activation of the valves 160 and 170, are taken in order to reduce the air charge in the cylinders. There follows step 2010.

In step 2010, the system determines whether a start request for starting the internal combustion engine is determined while the internal combustion engine is still running down, i.e. during the rundown phase T_Auslauf illustrated in FIG. 4. If this is the case, step 2020 follows. If this is not the case, step 2090 follows. In step 2020, the system checks whether the speed n of the internal combustion engine is above the speed threshold value ns (if appropriate by a minimum amount, e.g. 10 revolutions per minute). These checks can take place continuously or in synchronism with the crankshaft, in particular at each dead center position of the internal combustion engine. If the speed n of the internal combustion engine is above the speed threshold value ns, step 2030 follows and otherwise step 2070 follows.

In step 2030, the throttle valve is opened, or other measures, e.g. adjustment of the cams 180, 182 or appropriate electrohydraulic activation of the valves 160 and 170, are taken in order to increase the air charge in the cylinder which is the next to be in the inlet stroke. Via the intake pipe injection valve 50, fuel is injected into the intake pipe 80. There follows step 2040, in which the inlet cylinder ZYL2 is determined, i.e. the cylinder in which the air charge will be the next to show a significant increase in the inlet stroke. The inlet cylinder ZYL2 goes into the inlet stroke and sucks in the fuel/air mixture in the intake pipe 80. The inlet cylinder ZYL2 then makes a transition to the compression stroke. The speed n is higher than the speed threshold value ns. The speed threshold value ns is selected in such a way that the inlet cylinder ZYL2 just fails to pass through a top dead center position. At the speed n of the internal combustion engine, it is therefore ensured that the inlet cylinder ZYL2 passes through a top dead center position once again and makes a transition to the power stroke. There follows step 2050. In step 2050, the fuel/air mixture in the inlet cylinder ZYL2 is ignited, accelerating the rotation of the crankshaft 50, and step 2060 follows. In step 2060, further measures are carried out in order to bring about starting of the internal combustion engine, in particular a fuel/air mixture being ignited in a corresponding manner in the other cylinders of the internal combustion engine. With the starting of the internal combustion engine, the method according to the invention ends.

In step 2070, fuel is injected into the intake pipe 80 via the intake pipe injection valve 150. There follows step 2100.

In step 2090, the system checks, in a manner corresponding to step 1030 illustrated in FIG. 3, whether the speed n of the internal combustion engine has fallen below the speed threshold value ns. If this is not the case, the program branches back to step 2010. If this is the case, step 2100 follows.

Step 2100 corresponds to step 1040 in FIG. 3. The throttle valve is opened or some other air metering device, e.g. a camshaft adjustment system or an electrohydraulic valve timing system, is activated in such a way that the quantity of air supplied is increased. There follows step 2110.

In step 2110, the system determines whether there is a request for starting the internal combustion engine. If this is the case, step 2120 follows. If this is not the case, step 2110 is repeated until there is a request for starting the internal combustion engine. In step 2120, the system checks whether the internal combustion engine is stationary. This corresponds to the time period illustrated in FIG. 4 following the end of the oscillation phase T Phase. If this is the case, step 2060 follows, in which conventional measures for starting the internal combustion engine are carried out. As illustrated in FIG. 4, the internal combustion engine is started at a time tSdT.

If the internal combustion engine is not stationary in step 2120, step 2150 follows. In step 2150, the first meshing time tein1 is predicted. This prediction is performed by means of a characteristic map, for example. Using the speed n which was determined during a previous passage through the top dead center position of the inlet cylinder ZYL2 (at the fourth time t4 in the illustrative embodiment), the kinetic energy of the internal combustion engine can be determined and, from the second position DK2 of the air metering device, the air charge in the inlet cylinder ZYL2 and hence the strength of the gas spring compressed by the inlet cylinder ZYL2 in the compression stroke can be estimated. From this, it is possible to estimate the reverse oscillation time tosc, which is predicted as the first meshing time tein1. There follows step 2160, in which the system checks whether the time difference between the first meshing time tein1 and the present time is greater than the activation dead time T_tot of the starter 200. If this is the case, step 2170 follows. If this is not the case, step 2180 follows.

In step 2180, the second meshing time tein2 is determined. As explained in FIG. 5, the second meshing time tein2 is selected in such way that the speed n of the internal combustion engine from the second meshing time tein2 onwards remains in the speed interval between the negative threshold nminus and the positive threshold nplus. In the following step 2190, the starter 200 is meshed and starting is carried out from the second meshing time tein2. There follows step 2060, in which the further measures for starting the internal combustion engine are carried out. As an alternative, it is also possible, in step 2180, to determine a meshing interval, during which the speed n remains between the negative threshold nminus and the positive threshold nplus. In this case, the starter 200 is meshed and starting carried out in the meshing interval in step 2190.

Instead of an intake pipe injection valve 150, it is also conceivable for injection valves of the internal combustion engine to be arranged in the combustion chamber, i.e. to be configured as a direct injection valve. In this case, injection of fuel into the intake pipe immediately after the opening of the throttle valve can be omitted. The only factor of importance is that fuel should be injected in a suitable manner into the inlet cylinder ZYL2 before it is ignited upon restarting.

Figure 7:
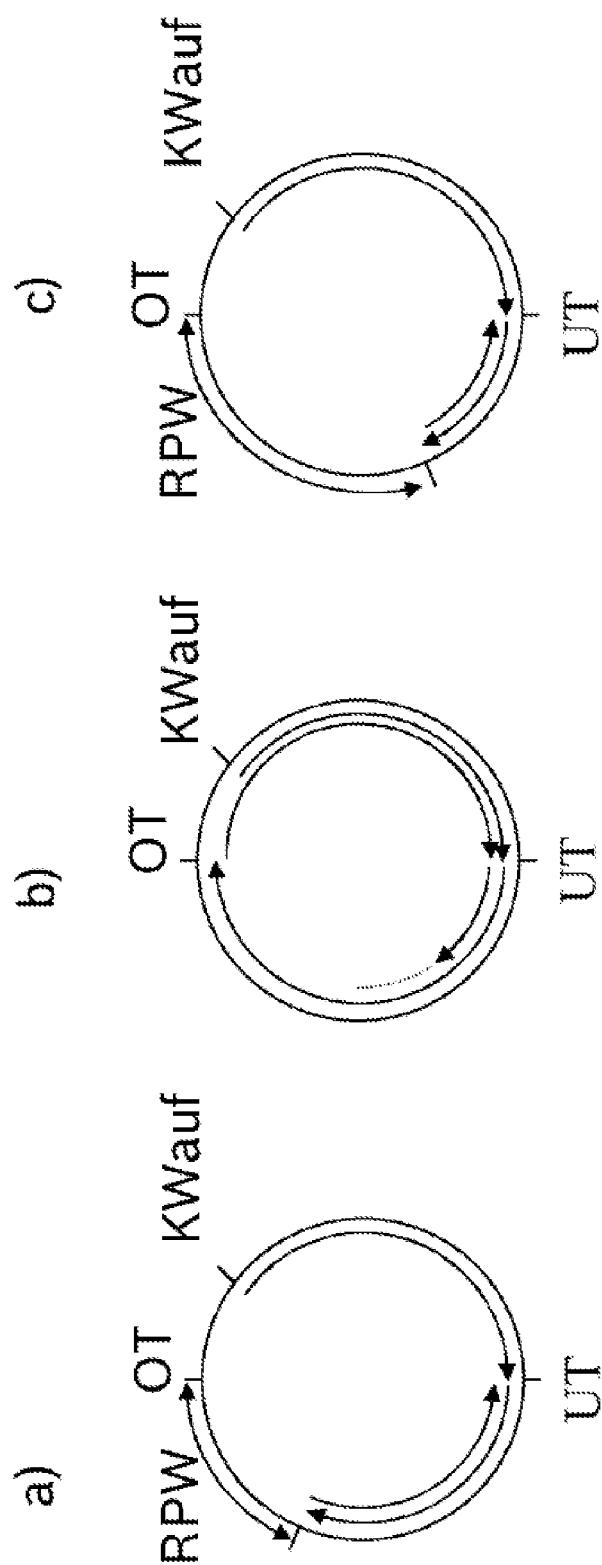
FIG. 7 shows schematically a final oscillatory motion of the internal combustion engine at different speed threshold values.

FIG. 7 illustrates the selection of the speed threshold value ns. FIG. 7a illustrates the oscillatory behavior of the inlet cylinder ZYL2 when the speed threshold value ns is correctly selected. At the opening crank angle KWauf, the inlet cylinder ZYL2 is in forward motion, passes through the bottom dead center position UT corresponding to the fourth dead center position T4 and reverses its direction of rotation at the reverse oscillation angle RPW. The further oscillatory motion of the inlet cylinder ZYL2 up to the stationary condition is shown only indicatively in FIG. 7a.

FIG. 7b illustrates the oscillatory behavior of the inlet cylinder ZYL2 if the speed threshold value ns selected is too high. A speed threshold value ns which is too high means that the kinetic energy of the internal combustion engine is too high when the throttle valve 100 is opened, i.e. at the opening crank angle KWauf. This leads to the inlet cylinder ZYL2 passing through the bottom dead center position UT corresponding to the fourth dead center position T4 and then also the top dead center position OT corresponding to the fifth dead center position T5. This leads to unwanted vibration in the drive train, and is felt to be uncomfortable by the driver.

FIG. 7c illustrates the oscillatory behavior of the inlet cylinder ZYL2 if the speed threshold value ns selected is too low. A speed threshold value ns which is too low means that the kinetic energy of the internal combustion engine is too low when the throttle valve 100 is opened, i.e. at the opening crank angle KWauf. The inlet cylinder ZYL2 passes through the bottom dead center position UT corresponding to the fourth dead center position, but has a relatively large reverse oscillation angle RPW. If, in step 3020, it is determined that the speed n of the internal combustion engine is higher than the speed threshold value ns, it is no longer safe to assume that the inlet cylinder ZYL2 will rotate beyond the top dead center position OT and hence that it will be possible to start the internal combustion engine quickly.

The selection of the speed threshold value ns is therefore of central importance for the functioning of the method according to the invention but, on the other hand, it is very difficult since it depends on variables which change during the life of the internal combustion engine, e.g. the friction coefficient of the engine oil used.

Figure 8:
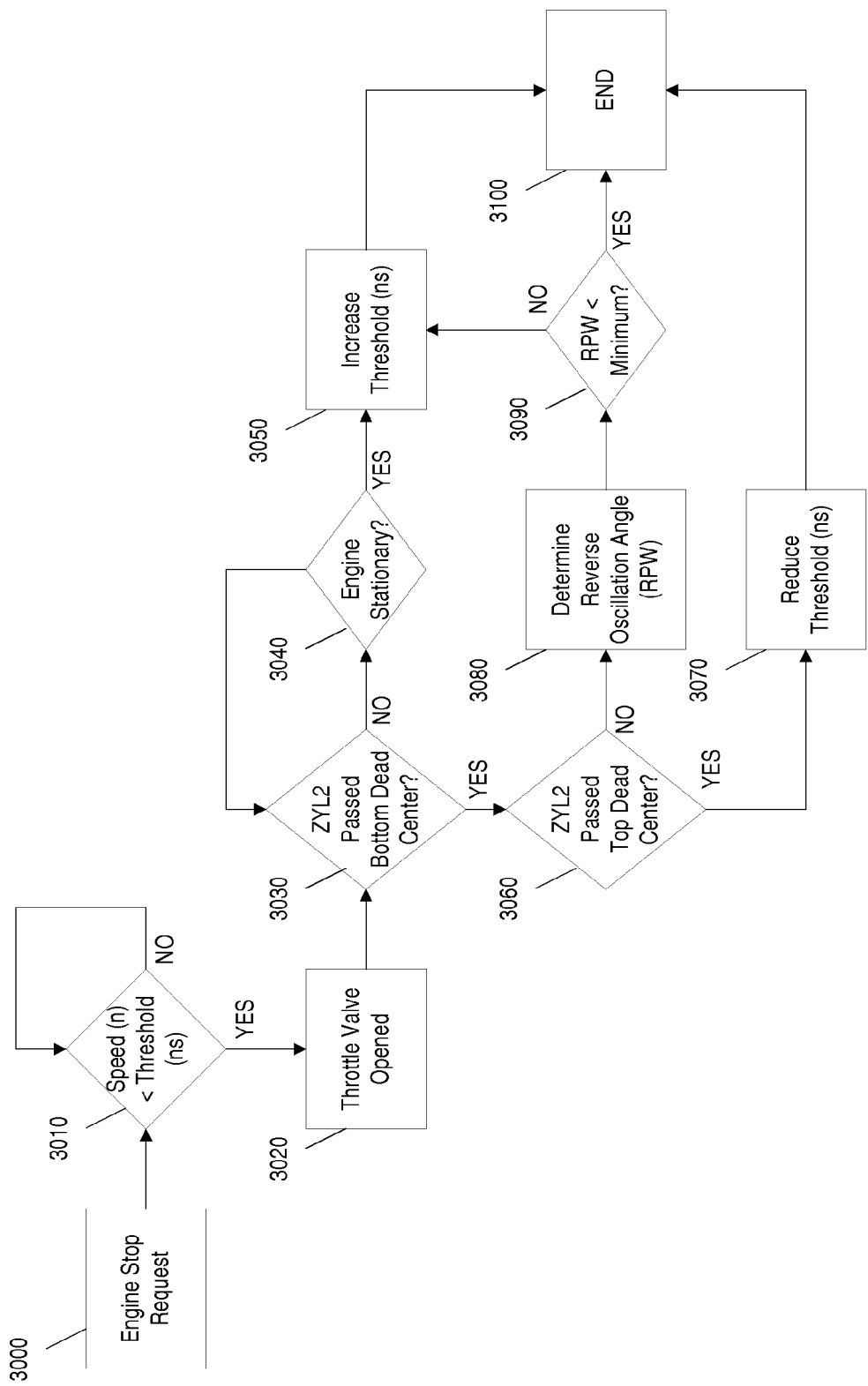
FIG. 8 shows the sequence of the method according to the invention for determining the speed threshold value.

FIG. 8 describes an adaptation method, by means of which an initially specified speed threshold value ns can be adapted in order to compensate for errors in the initialization or changes in the properties of the internal combustion engine. In step 3000, it is determined that there is a stop request to the internal combustion engine, and measures for starting the internal combustion engine are initiated. In step 3010, the system checks, in a manner corresponding to step 1030, whether the speed n of the internal combustion engine has fallen below the speed threshold ns. If this is the case, step 3020 follows, in which the throttle valve is opened in a manner corresponding to step 1040. There follows step 3030, in which the system checks whether the inlet cylinder ZYL2 has already passed through the bottom dead center position UT. If this is not the case, step 3040 follows. If it is the case, step 3060 follows.

Step 3040 takes account of the case where the speed threshold value ns selected is so low that the internal combustion engine comes to a halt even before the inlet cylinder ZYL2 passes through the bottom dead center position UT. For this purpose, the system checks in step 3040 whether the internal combustion engine is stationary. If this is not the case, the program branches back to step 3030. If the internal combustion engine is stationary, step 3050 follows. In step 3050, the speed threshold value ns is increased. There follows step 3100, with which the method ends.

In step 3060, the rotary motion of the internal combustion engine is monitored. If the internal combustion engine turns the inlet cylinder ZYL2 further beyond the top dead center position OT, step 3070 follows. If the top dead center position OT is not reached, step 3080 follows. In step 3070, the behavior is as illustrated in FIG. 7b, and the speed threshold value ns is reduced. There follows step 3100, with which the method ends.

In step 3080, the reverse oscillation angle RPW is determined by means of the crankshaft sensor 220, for example. There follows step 3090. In step 3090, the system checks whether the reverse oscillation angle RPW is smaller than a minimum reverse oscillation angle RPWS, which is 10° for example. If the reverse oscillation angle RPW is smaller than the minimum reverse oscillation angle RPWS, the correct behavior shown in FIG. 7a is present, and step 3100 follows, with which the method ends. If the reverse oscillation angle RPW is larger than the minimum reverse oscillation angle RPWS, the behavior illustrated in FIG. 7c is present, and step 3050 follows, in which the speed threshold value ns is increased.

The increase in the speed threshold value ns in step 3050 can either take place incrementally or the speed threshold value ns is increased to an initial threshold value nsi, at which it is ensured that the internal combustion engine exhibits the behavior illustrated in FIG. 7b, i.e. that the speed threshold value ns selected is then initially too high. The initial threshold value nsi can be designed as an applicable threshold value, for example. It is selected in such a way that, within the scope of the operating parameters that are possible during the operation of the internal combustion engine, e.g. variations in the leakage of the air charge, differences in the engine oil or individual differences in the scatter of the frictional effect of the internal combustion engine, the internal combustion engine exhibits the behavior illustrated in FIG. 7b, i.e. that the inlet cylinder ZYL2 goes into the power stroke.

As an option, it is also possible for the adaptation of the speed threshold value ns to be carried out when restarting of the internal combustion engine has not taken place correctly: the speed threshold value ns is increased if the system has decided in step 2020 that the determined speed n of the internal combustion engine is higher than the speed threshold value ns and if, after steps 2030, 2040 and 2050 are carried out, it is ascertained in step 2060 that the inlet cylinder (ZYL2) has not gone into the power stroke.

The invention claimed is:

1. A method for restarting an internal combustion engine, the method comprising:
   controlling, by an engine controller, an engine actuator to produce a low air charge in a first cylinder of the internal combustion engine and a high air charge in a second cylinder;
   selecting, by the engine controller, a predetermined speed threshold value, the speed threshold being selected in based at least in part on the high air charge of the second cylinder and the low air charge of the first cylinder, wherein selecting the predetermined speed threshold value includes selecting a predetermined speed threshold such that
      the second cylinder goes into a power stroke as the internal combustion engine runs down if the determined speed is higher than the predetermined speed threshold value, and
      does not go into a power stroke as the internal combustion engine runs down if the determined speed is not higher than the predetermined speed threshold value;
   comparing, by the engine controller, a determined speed of the internal combustion engine with the selected speed threshold value;
   controlling, by the engine controller, the restarting of the internal combustion engine based on whether the determined speed of the internal combustion engine exceeds the selected speed threshold value; and
   reducing, by the engine controller, the selected speed threshold value if
      the determined speed is lower than the predetermined speed threshold value and
      the second cylinder goes into the power stroke as the internal combustion engine runs down.

2. The method as claimed in claim 1, wherein controlling the restarting of the internal combustion engine based on whether the determined speed of the internal combustion engine exceeds the selected speed threshold value includes
   restarting the internal combustion engine without using a starter if the determined speed is higher than the selected speed threshold value, and
   restarting the internal combustion engine using the starter if the determined speed is not higher than the predetermined speed threshold value.

3. The method as claimed in claim 1, further comprising igniting a fuel/air mixture in the second cylinder if the determined speed of the internal combustion engine is higher than the selected speed threshold value.

4. The method as claimed in claim 1, further comprising:
   predicting, by an engine controller, a speed profile of the internal combustion engine;
   determining either a first meshing time or a second meshing time, depending on the predicted speed profile; and
   restarting the internal combustion engine at the first meshing time, at which a starter is meshed, or the second meshing time, at which the starter is meshed if the determined speed is not higher than the selected speed threshold value.

5. The method as claimed in claim 4, wherein the first meshing time or the second meshing time is before the internal combustion engine comes to a halt.

6. A method for restarting an internal combustion engine, the method comprising:
   controlling, by an engine controller, an engine actuator to produce a low air charge in a first cylinder of the internal combustion engine and a high air charge in a second cylinder;
   selecting, by the engine controller, a predetermined speed threshold value, the speed threshold being selected in based at least in part on the high air charge of the second cylinder and the low air charge of the first cylinder, wherein selecting the predetermined speed threshold value includes selecting a predetermined speed threshold such that
      the second cylinder goes into a power stroke as the internal combustion engine runs down if the determined speed is higher than the predetermined speed threshold value, and
      does not go into a power stroke as the internal combustion engine runs down if the determined speed is not higher than the predetermined speed threshold value;
   comparing, by the engine controller, a determined speed of the internal combustion engine with the selected speed threshold value;
   controlling, by the engine controller, the restarting of the internal combustion engine based on whether the determined speed of the internal combustion engine exceeds the selected speed threshold value; and
   increasing, by the engine controller, the selected speed threshold value if
      the determined speed is higher than the predetermined speed threshold value and
      the second cylinder does not go into the power stroke.

7. A method for restarting an internal combustion engine, the method comprising:
   controlling, by an engine controller, an engine actuator to produce a low air charge in a first cylinder of the internal combustion engine and a high air charge in a second cylinder;
   selecting, by the engine controller, a predetermined speed threshold value, the speed threshold being selected in based at least in part on the high air charge of the second cylinder and the low air charge of the first cylinder;
   comparing, by the engine controller, a determined speed of the internal combustion engine with the selected speed threshold value;
   predicting, by an engine controller, a speed profile of the internal combustion engine;
   determining either a first meshing time or a second meshing time depending on the predicted speed profile; and restarting the internal combustion engine at the first meshing time, at which a starter is meshed, or the second meshing time, at which the starter is meshed, if the determined speed is not higher than the selected speed threshold value, wherein the first meshing time is the next possible reversal point of the rotary motion of the internal combustion engine.

8. The method as claimed in claim 7, wherein selecting the predetermined speed threshold value includes selecting a predetermined speed threshold such that the second cylinder goes into a power stroke as the internal combustion engine runs down if the determined speed is higher than the predetermined speed threshold value, and does not go into a power stroke as the internal combustion engine runs down if the determined speed is not higher than the predetermined speed threshold value.

9. The method as claimed in claim 7, wherein the next possible reversal point follows a time at which a start request is determined by at least a specifiable activation dead time.

10. The method as claimed in claim 7, wherein the second meshing time is selected in such a way that the predicted speed does not exceed a specifiable positive threshold from the second meshing time onwards.

11. The method as claimed in claim 7, wherein the second meshing time is selected in such a way that the predicted speed does not fall below a specifiable negative threshold from the second meshing time onwards.

12. A computer program, wherein it is programmed for use in a method as claimed in claim 1.

13. An electric storage medium for an open-loop and/or closed-loop control device for an internal combustion engine, wherein a computer program for use in a method as claimed in claim 1 is stored on said medium.

14. An open-loop and/or closed-loop control device for an internal combustion engine, wherein it is programmed for use in a method as claimed in claim 1.

\* \* \* \* \*